UNITED STATES PATENT OFFICE.

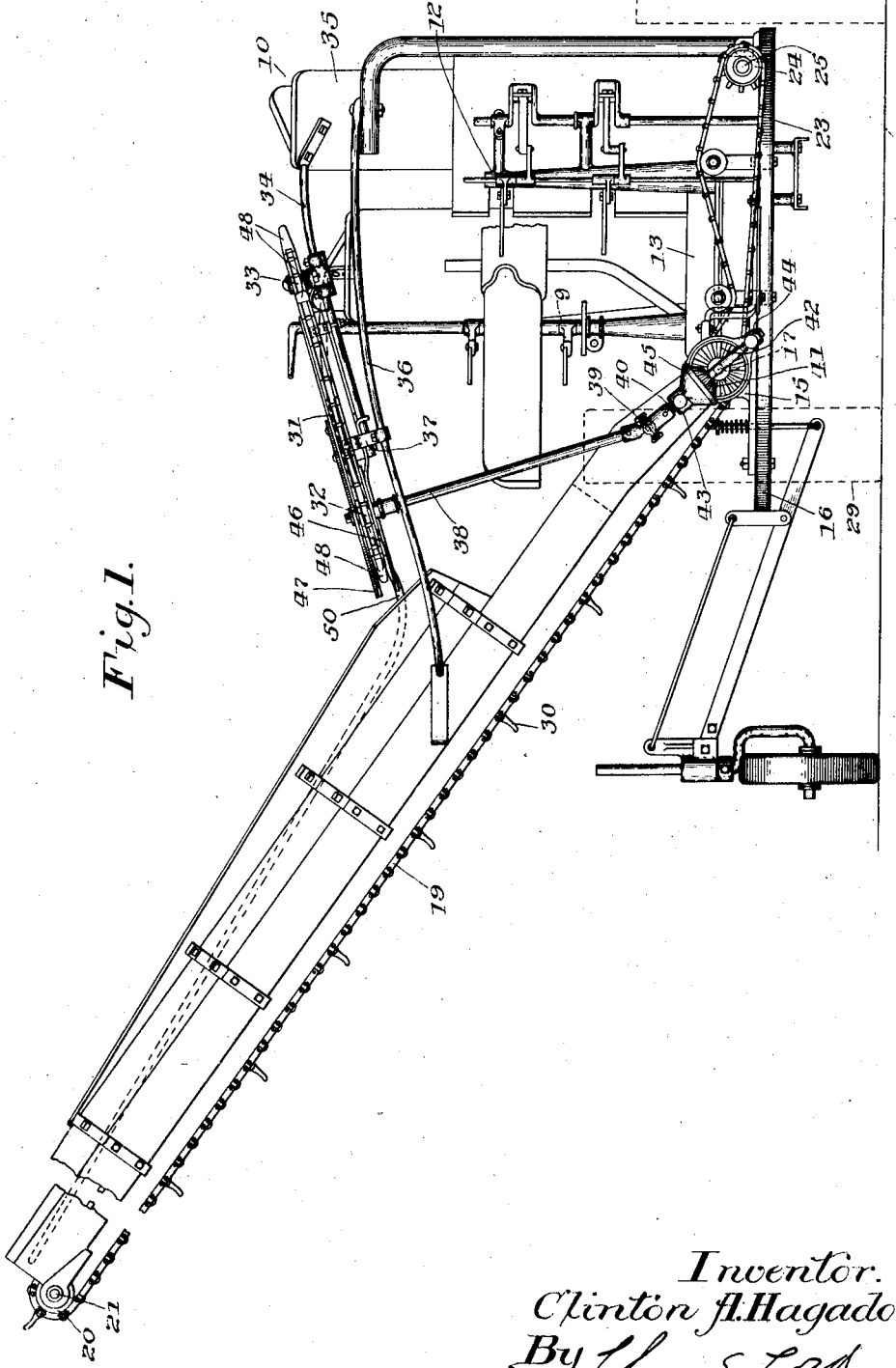

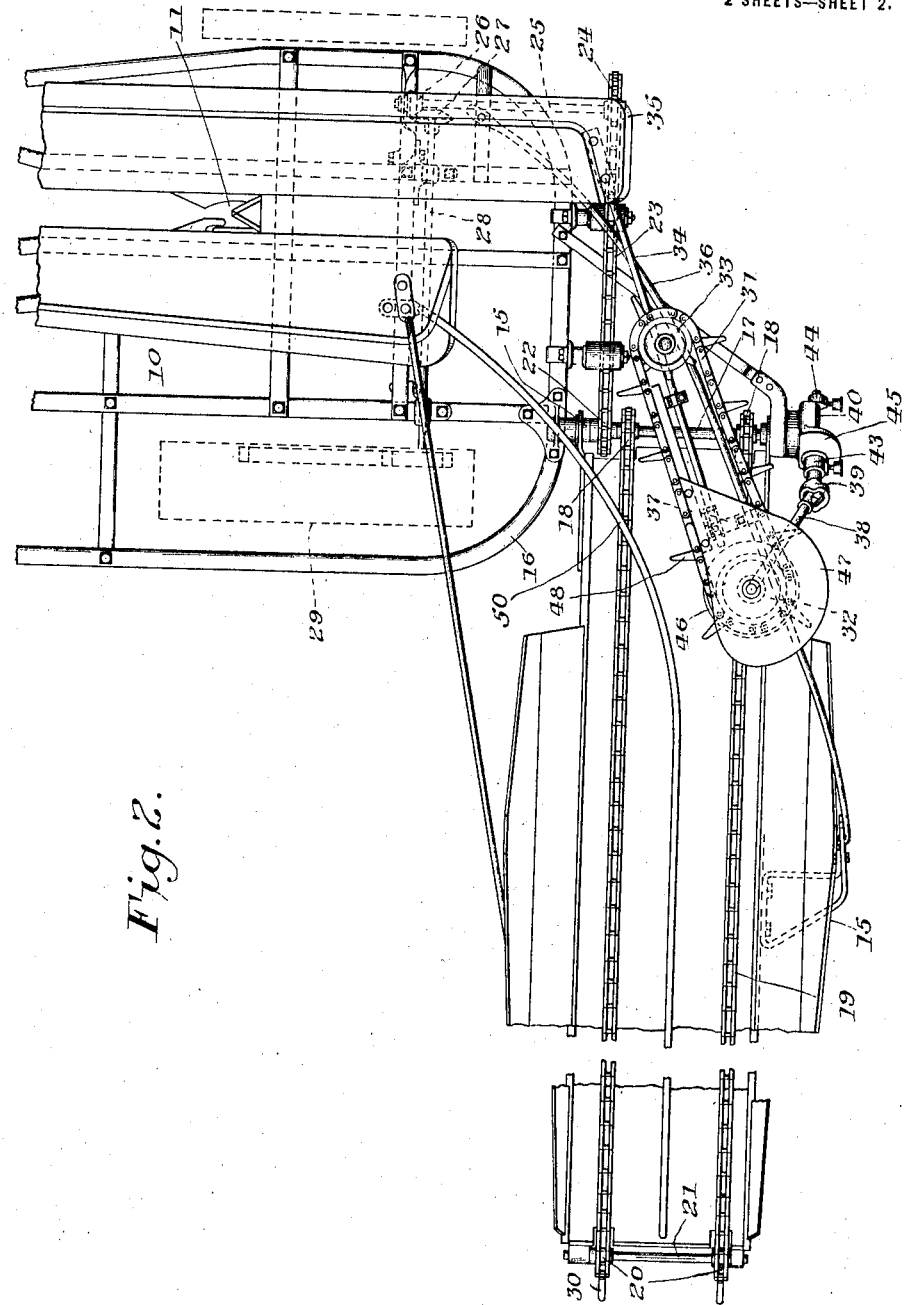

CLINTON A. HAGADONE, OF WESTERN SPRINGS, ILLINOIS, ASSIGNOR, BY MESNE ASSIGNMENTS, TO INTERNATIONAL HARVESTER COMPANY, A CORPORATION OF NEW JERSEY.

CORN-HARVESTER.

1,328,668.  Specification of Letters Patent.  Patented Jan. 20, 1920.

Application filed July 10, 1916. Serial No. 108,340.

*To all whom it may concern:*

Be it known that I, CLINTON A. HAGADONE, a citizen of the United States, residing at Western Springs, in the county of Cook and State of Illinois, have invented certain new and useful Improvements in Corn-Harvesters, of which the following is a full, clear, and exact specification.

This invention relates to corn harvesters, and more particularly to means for feeding bound bundles from the binding mechanism to a bundle elevator or conveyer.

One of the objects of my invention is to positively feed bundles from the binding mechanism of a harvester to a bundle elevator or conveyer.

Another object is to improve and simplify the mechanism for the positive feeding means.

Another object of my invention is to provide, in a corn harvester, suitable operating mechanism adapted to meet all of the requirements for successful commercial operation.

These and other objects are accomplished by providing, in combination with the binding mechanism and the bundle conveyer of a harvester, suitable driven means operable between the binding mechanism and bundle conveyer for positively feeding bundles from the former to the latter.

The invention is illustrated on the accompanying sheets of drawings, in which—

Figure 1 is a rear elevation of a corn harvester showing a bundle elevator in side elevation, the harvester being provided with my positive feeding mechanism between the binding mechanism and elevator; and Fig. 2 is a plan view of the same.

The various novel features of my invention will be apparent from the following description and drawings and will be particularly set forth in the appended claim.

I have chosen to illustrate my invention in connection with a corn binder 10 having the usual cutting mechanism 11 and binding mechanism 12, the bundles being bound in a vertical position while standing upon the usual butts chute 13. After the formed bundles are discharged by suitable discharge mechanism 9 from the binding mechanism, depending upon choice, the bundles are delivered directly to the ground or are elevated for the purpose of placing them into wagons. When elevators are used, they are secured to the rear of the binder in any approved manner. In this case the elevator is pivotally mounted at its lower end on a suitable support 15 extending rearwardly from the main frame 16 of the harvester. Mounted to rotate in the support 15 is a shaft 17, upon which is mounted a pair of sprocket wheels 18, around which pass the chains of the movable element 19 of the elevator, said chains also passing around sprocket wheels 20 mounted on a shaft 21 at the upper end of the elevator. Also mounted upon the shaft 17 is another sprocket wheel 22, around which passes a chain 23 receiving motion from a gear 24 mounted upon one end of a shaft 25, having at the other end thereof a bevel gear 26 meshing with a bevel gear 27 mounted upon one end of another shaft 28 which is operatively connected to and receives its motion from the bull wheel 29 of the harvester. The chains of the movable element of the elevator are provided with teeth 30 for forking bundles when they are deposited thereupon.

Experience has taught that bundles formed by the binding mechanism are not always transmitted therefrom to the movable element of the elevator in the most efficient manner, that is to say, under certain unfavorable conditions; for example, when the corn is tangled, the bundles are prevented from passing over into engagement with the elevator in a proper manner and become clogged at the foot thereof. Primarily, what is meant is this: When corn is badly tangled, one portion of a stalk may be bound in a bundle discharged from the binding mechanism, another portion of the same bundle being bound or fastened in a bundle being formed in the binding mechanism, thus causing a bridging of the two bundles. It is apparent that under such conditions the bundle discharged will not pass freely over to the elevator unless some means is provided for accomplishing the desired result. When such tangled conditions exist, it is necessary to cause a separation of the bundles and to positively feed the heads of the discharged bundles away from the vicinity of the binding mechanism toward the elevator, preferably giving the heads of the bundles a pivotal movement with respect to the butt ends of the bundles.

I am aware of the fact that harvesters have been provided with head chains for feeding bundles from the binding mechanism to the bundle elevator or conveyer, but such head chains have not been as efficient in operation as they might have been for the reason, among others, that the head chains have been driven in a manner such that the loose sides thereof have been presented to the bundles for conveying the same between the binding mechanism and bundle elevator. This being true, it is found that the feed is not as positive as it might be. Among other things, I have provided a head chain which is driven in a manner to present its tight side to the bundles to positively feed them from the binding mechanism to the bundle elevator.

The head chain 31 passes around sprocket wheels 32 and 33, the latter of which is adjustably mounted on a supporting rod 34 extending rearwardly and stubblewardly from the grainward gathering board 35. The end of this rod 34 is coupled to an elevator supporting rod 36 by a clamp 37 to assist in holding the rod 34 rigid. The sprocket wheel 32 is mounted upon one end of an upwardly extending inclined shaft 38 which is connected by a universal coupling 39 to a small shaft 40 having mounted thereon a bevel gear 41 which meshes with a bevel gear 42 upon the outer or rear end of the shaft 17. The shaft 40 is mounted in suitable bearings 43 and 44 in a housing 45 for the gears 41 and 42. By means of this driving arrangement it is seen that the head chain 31 is driven from the same shaft 17 which transmits motion to the movable element of the elevator, the shaft 17 in turn being actuated through the various connections heretofore described, the source of which is the bull wheel 29. The head chain 31 is held in driving relationship with or prevented from dropping away from the gear 32 by a flange 46 formed integral with the gear wheel. Mounted over the gear wheel 32 is a shield 47 which acts as a stripper to disengage the bundles from the teeth 48 of the head chain when the heads of the bundles are directly over the elevator.

By means of this arrangement, when the bundles which are bound by the binding mechanism are discharged therefrom, they are guided into and held in engagement with the driving chain by a suitable rod 50, are forked by the teeth 48 and positively fed from the binding mechanism to the elevator on and by the tight side of the chain 31. In feeding the bundles on the tight side of the chain, there is no tendency for the bundles to be forced out of engagement with the teeth 48 of the chain. At the same time the teeth, under these conditions, are more effective in pulling a discharged bound bundle away from a bundle being bound if the corn in said bundles is intertangled.

It is evident that there may be various modification of my invention as herein particularly shown and described, and it is my intention to cover all such modifications which do not involve a departure from the spirit and scope of the invention as set forth in the following claim.

What I claim as new is:

In a harvester, binding mechanism, an elevator having a movable element, a shaft through which motion is transmitted to the movable element of said elevator, a second shaft operatively connected to said first-mentioned shaft, a sprocket wheel mounted on said second shaft, a second sprocket wheel supported adjacent said binding mechanism, and a chain driven from said first-named sprocket wheel and extending around the second-named sprocket wheel, said chain being located in the path of the bundles discharged from said binding mechanism and operating to positively withdraw the bundles from said binding mechanism, and feed said bundles to the elevator.

In testimony whereof I affix my signature.

CLINTON A. HAGADONE.